(12) United States Patent
Gimvang

(10) Patent No.: US 8,940,364 B2
(45) Date of Patent: Jan. 27, 2015

(54) SYSTEM, FORMULATION AND METHOD FOR PRODUCING CERAMIC VACUUM MICROSPHERES

(75) Inventor: Bo H. Gimvang, South Daytona, FL (US)

(73) Assignee: Xurex, Inc., Kansas City, MO (US)

( * ) Notice: Subject to any disclaimer, the term of this patent is extended or adjusted under 35 U.S.C. 154(b) by 94 days.

(21) Appl. No.: 13/414,973

(22) Filed: Mar. 8, 2012

(65) Prior Publication Data

US 2012/0231161 A1 Sep. 13, 2012

Related U.S. Application Data

(63) Continuation-in-part of application No. 12/317,155, filed on Dec. 19, 2008, now abandoned.

(51) Int. Cl.
| | | |
|---|---|---|
| *B05D 7/00* | (2006.01) | |
| *F26B 3/12* | (2006.01) | |
| *C04B 35/632* | (2006.01) | |
| *F26B 5/04* | (2006.01) | |
| *B01J 2/00* | (2006.01) | |
| *C04B 35/628* | (2006.01) | |
| *B01J 2/04* | (2006.01) | |
| *C04B 35/626* | (2006.01) | |
| *C04B 38/00* | (2006.01) | |

(52) U.S. Cl.
CPC ......... *B01J 2/006* (2013.01); *C04B 2235/3409* (2013.01); *F26B 3/12* (2013.01); *C04B 35/632* (2013.01); *F26B 5/041* (2013.01); *C04B 35/628* (2013.01); *B01J 2/04* (2013.01); *C04B 35/6263* (2013.01); *C04B 2235/528* (2013.01); *C04B 2235/3427* (2013.01); *C04B 38/009* (2013.01); *C04B 35/62655* (2013.01); *C04B 2235/5436* (2013.01); *C04B 35/6268* (2013.01)
USPC ........................................................ 427/215

(58) Field of Classification Search
CPC ......... B01J 2/006; C04B 35/6268; F26B 3/12
USPC ........................................ 427/212, 213, 215
See application file for complete search history.

(56) References Cited

U.S. PATENT DOCUMENTS

| | | | |
|---|---|---|---|
| 3,617,358 A | 11/1971 | Dittrich | |
| 5,028,360 A | 7/1991 | Ito et al. | |
| 5,030,400 A | 7/1991 | Danielsen et al. | |
| 5,069,702 A * | 12/1991 | Block et al. | 65/21.4 |
| 6,711,831 B1 | 3/2004 | Hansen et al. | |
| 2006/0251826 A1 | 11/2006 | Pfeifer et al. | |

OTHER PUBLICATIONS

Okuyania, Preparation of nanoparticles via spray route, Chemical Engineering Science, 58 (2003) p. 537-547.

\* cited by examiner

*Primary Examiner* — Tabatha Penny

(57) ABSTRACT

A system, formulation and method for producing ceramic vacuum micro spheres utilizing a spray dryer having a top mounted atomizer rotary wheel and a side or bottom mounted dual fluid nozzle, forming microspheres by spraying solution from the top mounted atomizer rotary wheel and simultaneously coating the microspheres by spraying solution from the side or bottom mounted dual fluid nozzle, transferring the microspheres to a secondary heating unit, and drying the microspheres, all under vacuum of between 1 to 5 millibars.

16 Claims, No Drawings

SYSTEM, FORMULATION AND METHOD FOR PRODUCING CERAMIC VACUUM MICROSPHERES

This application is a continuation in part of U.S. patent application Ser. No. 12/317,155, filed Dec. 19, 2008, claiming the benefit of U.S. Provisional Patent application Ser. No. 61/015,103, filed Dec. 19, 2007.

BACKGROUND

There is a need in the art for a system and method of producing ceramic microspheres for use in the recreational, pharmaceutical and cosmetics industries. In particular, there is a need in the art for a system and method of producing ceramic microspheres wherein the resulting product is substantially clear, uniformly-sized, less water soluble and resistant to crushing.

DETAILED DESCRIPTION

In one embodiment, the present invention includes a system for producing ceramic microspheres including a dual-stage drying apparatus. The drying apparatus is adapted to receive a formulation and process the formulation according to a predetermined protocol in order to create ceramic microspheres, which may include a substantially vacuous interior, i.e. ceramic vacuum microspheres.

The system can include a first stage dryer having an input portion and an output portion. The inlet portion receives a raw formulation, and the outlet portion expels the resultant microsphere product into a second stage, described in more detail below. The first stage dryer can include for example a spray dryer having a dual fluid nozzle or atomizing centrifugal wheel adapted for receiving a liquid formulation and distributing it substantially uniformly throughout the interior, heated portion of the first stage dryer. In one variation of the system, the first stage dryer can have an inlet temperature ranging between two hundred fifty and five hundred degrees Celsius. The outlet portion temperature can range between eighty and one hundred fifty degrees Celsius. Other suitable temperature ranges are also anticipated by the present invention, provided that the output product of the first stage dryer is sufficiently formed in order to be further processed in the second stage dryer.

The system can further include a second stage dryer that can be connected to the outlet portion of the first stage dryer. The second stage dryer can include for example a rotary kiln furnace, a tube furnace, a rotary tube furnace, or any other suitable heating means or mechanism. The second stage dryer can include one or more temperature zones, within which the temperature can range anywhere between two hundred degrees Celsius and one thousand seven hundred degrees Celsius. For example, the second stage dryer can have a first zone at a feed inlet having a temperature between three hundred and five hundred degrees Celsius, a second zone having a temperature between four hundred and eight hundred degrees Celsius, and a third zone having a temperature between two hundred and four hundred degrees Celsius.

Typical ceramic microsphere production involves a single stage machine or dryer. The resultant products are certainly usable in many industries, but not generally of the highest grade or quality. In order to improve the density factor as well as the crushing strength of the microspheres, the system of the preferred embodiment can employ a second drying (heating) stage. First order microspheres can be input into the second stage dryer manually or through automated machines and/or processes. Using a second drying stage imparts a number of benefits on the end product. For example, a typical first order microsphere contains between ten and eighteen percent moisture, which in turn decreases the strength of the microspheres and increases the chances of them being water soluble. By using the second stage drying process disclosed herein, the final product will have little to no moisture content, thereby increasing the strength, water-imperviousness, clarity and functionality of the ceramic vacuum microspheres.

The system of the preferred embodiment and variations thereof is adapted to produce the ceramic vacuum microspheres in response to the input of at least the following example formulations, or any combination thereof.

A first example formulation includes sodium, lithium or potassium silicate, boric acid and urea. In one variation of the first example formulation, the formulation is approximately seventy eight percent sodium, lithium or potassium silicate by weight, up to approximately three percent boric acid by weight via a three percent solution in water, and approximately nineteen percent urea by weight via a thirty percent solution in water. In another variation of the first example formulation, the formulation is between sixty seven and eighty five percent sodium, lithium or potassium silicate by weight, up to three percent boric acid by weight and between fifteen and thirty percent urea by weight. Other alkali metal-silicate suitable for creating ceramic vacuum microspheres may be substituted for the alkali metal-silicates set forth above.

A second example formulation includes sodium, lithium or potassium silicate, sodium, lithium or potassium methyl siliconate, boric acid and urea. In one variation of the second example formulation, the formulation is approximately seventy three percent sodium, lithium or potassium silicate by weight, approximately five percent sodium, lithium or potassium methyl siliconate by weight, approximately three percent boric acid by weight via a three percent solution in water, and approximately nineteen percent urea by weight via a thirty percent solution in water. In another variation of the second example formulation, the formulation is between sixty seven and eighty five percent sodium, lithium or potassium silicate by weight, up to five percent sodium, lithium or potassium methyl siliconate by weight, up to three percent boric acid by weight and between fifteen and thirty percent urea by weight. As noted above, other alkali metal-silicates suitable for creating ceramic vacuum microspheres may be utilized.

A third example formulation includes potassium silicate, boric acid and urea. In one variation of the third example formulation, the formulation is approximately seventy eight percent potassium silicate by weight, approximately three percent boric acid by weight via a three percent solution in water, and approximately nineteen percent urea by weight via a thirty percent solution in water. In another variation of the third example formulation, the formulation is between seventy and eighty five percent potassium silicate by weight, up to five percent boric acid by weight and between fifteen and thirty percent urea by weight. Other suitable silicates can include lithium silicate, sodium silicate, or any other alkali metal-silicate suitable for creating ceramic vacuum microspheres.

A fourth example formulation includes potassium silicate, potassium methyl silicate, boric acid and urea. In one variation of the fourth example formulation, the formulation is approximately seventy two percent potassium silicate by weight, approximately six percent potassium methyl siliconate by weight, approximately three percent boric acid by weight via a three percent solution in water, and approximately nineteen percent urea by weight via a thirty percent solution in water. In another variation of the fourth example formulation, the formulation is between sixty and seventy five percent potassium silicate by weight, up to ten percent potassium methyl siliconate by weight, up to five percent boric acid by weight and between fifteen and thirty percent urea by weight. As noted above, other suitable silicates can include lithium silicate, sodium silicate, or any other alkali metal-silicate suitable for creating ceramic vacuum microspheres.

A fifth example formulation includes lithium silicate, boric acid and urea. In one variation of the fifth example formulation, the formulation is approximately eighty percent lithium silicate by weight, approximately two percent boric acid by weight via a three percent solution in water, and approximately eighteen percent urea by weight via a thirty percent solution in water. In another variation of the fifth example formulation, the formulation is between seventy and eighty five percent lithium silicate by weight, up to five percent boric acid by weight and between fifteen and thirty percent urea by weight. Other suitable silicates can include sodium silicate, potassium silicate, or any other alkali metal-silicate suitable for creating ceramic vacuum microspheres.

A sixth example formulation includes lithium silicate, potassium methyl silicate, boric acid and urea. In one variation of the fourth example formulation, the formulation is approximately eighty percent lithium silicate by weight, approximately six percent potassium methyl siliconate by weight, approximately two percent boric acid by weight via a three percent solution in water, and approximately twelve percent urea by weight via a thirty percent solution in water. In another variation of the sixth example formulation, the formulation is between seventy and ninety percent lithium silicate by weight, up to ten percent potassium methyl siliconate by weight, up to three percent boric acid by weight and between eight and sixteen percent urea by weight. As noted above, other suitable silicates can include potassium silicate, sodium silicate, or any other alkali metal-silicate suitable for creating ceramic vacuum microspheres.

A seventh example formulation includes an alkali silicate, a non-ionic fluorocarbon surfactant, potassium carbonate, hydrogen peroxide and boric acid. In one variation of the seventh example formulation, the formulation is approximately seventy two percent alkali silicate by weight, approximately five tenths of a percent non-ionic fluorocarbon surfactant by weight, approximately three percent potassium carbonate by weight, approximately twenty one and one half percent hydrogen peroxide by weight via a thirty six percent solution in water, and approximately three percent boric acid by weight via a thirty percent solution in water. In another variation of the seventh example formulation, the formulation is between sixty and eighty percent alkali silicate by weight, between zero (trace) and two percent non-ionic fluorocarbon surfactant by weight, up to five percent potassium carbonate by weight, between fifteen and twenty five percent hydrogen peroxide by weight, and up to five percent boric acid by weight. As noted above, any suitable alkali metal-silicate suitable can be used in the production of ceramic vacuum microspheres.

An eighth example formulation includes an alkali silicate, sodium, lithium or potassium methyl siliconate, a non-ionic fluorocarbon surfactant, an alkali carbonate, boric acid and urea. In one variation of the eighth example formulation, the formulation is approximately sixty eight percent alkali silicate by weight, approximately ten percent sodium, lithium or potassium methyl siliconate by weight, approximately two tenths of a percent non-ionic fluorocarbon surfactant by weight, approximately two and eight tenths percent alkali carbonate by weight, approximately three percent boric acid by weight via a three percent solution in water, and approximately sixteen percent urea by weight via a thirty percent solution in water. In another variation of the eighth example formulation, the formulation is between sixty and seventy five percent alkali silicate by weight, between one and five percent sodium, lithium or potassium methyl siliconate by weight, up to one percent non-ionic fluorocarbon surfactant by weight, up to five percent alkali carbonate by weight, up to five percent boric acid by weight and between ten and twenty percent urea by weight. Both the alkali silicate and the alkali carbonate can include any of at least the following alkalis: lithium, sodium and/or potassium.

In each of the eight example formulations, one can partially or totally substitute for boric acid using an organic acetate, such as for example di-acetate, tri-acetate, and/or glycol-tri-acetate.

Given the example formulations described above as well as the systems and methods described herein, the inventor has found that the resultant product will range in density between five-hundredths of a gram per cubic centimeter to one and two tenths grams per cubic centimeter. The particle size of the resultant product ranges from approximately one hundred nanometers to as much as three hundred fifty microns.

Additionally, any of the example formulations described herein can be colored within a certain color spectrum and/or selection, including for example red, brown, black, gray, blue, green, yellow, and any mixtures thereof, i.e. violet. In one example methodology, the color pigment can be provided in a paste form and based upon iron oxide, although many other suitable pigments and/or coloring arrangements can be performed according to the present invention. In a variation of the example methodology, the concentration of the color pigment that can be added to the example formulations can range between fifteen and fifty-five percent by weight with respect to the weights of the solids in the respective formulation, although other ranges and/or concentrations are also usable in the present invention.

In the first phase, the spray dryer system used has both a top mounted atomizer rotary wheel and a side or bottom mounted dual fluid nozzle which may both be utilized at the same time. The atomizer wheel rotates with at speeds up to 63,000 rpm. This in turn creates very small particles within the entire heated spray chamber. The dual spray units are used simultaneously within the heated spray chamber, such that while the top mounted rotating atomizer wheel is atomizing the solutions into submicronized sized hollow particles, the side bottom mounted dual fluid nozzle introduces other solutions that will counteract with the top sprayed particles and create an outer shell to the semi-fused particles created by the top mounted rotating wheel. Depending upon the choice of solution, the outer shell can make the sub-micron particles float in liquid, dissolve, semi-dissolve over extended time (i.e., time-release), or can make the spheres reactive. The spray drying unit is operated under vacuum at an average pressure of 1-5 millibars.

With regards to the temperature ranges within the spray drying unit, there are two temperature zones, inlet and outlet. The inlet temperature should be within the range of 650 degrees F.-800 degrees F. and the outlet temperature should be within the range of 275 degrees .-350 degrees F. These processing temperature chosen from these ranges are dependent upon the intended use of the microspheres and the degree of fusion that is desired. At his paint approximately 15-20% moisture remains in the microspheres.

In the second phase, the spray dryer is preferably connected to a secondary heating unit, a rotary-tube-furnace or rotary kiln, or a vertical tube furnace with gravity feeding of the particles from the top of the tube, in order to finalize the total fusion of the ceramic-glass hollow vacuum sphere. This secondary heating unit is preferably connected to the first stage heated spray dryer such that the spheres remain under vacuum, typically at an average pressure of 1-5 millibars, such that sufficient outgassing occurs. Alternatively, a separate secondary heating unit may be used with the microspheres being transferred by batch or conveyor means. The drying temperature of the secondary heating unit is preferably between 500 and 1500 degrees F.

Prior to the second phase drying process, the microspheres produced in the first phase may be provided with an additional outer layer by repeating phase one with the semi-fused particles and a new solution. It is also possible to apply a light mist of sodium, lithium or potassium methyl siliconate to the microparticles during the second phase to increase flow rates and to reduce clumping.

As a person skilled in the art will recognize from the previous detailed description and from the figures and claims, modifications and changes can be made to the preferred embodiments of the invention without departing from the scope of this invention defined in the following claims.

I claim:

1. A ceramic vacuum microsphere manufacturing process comprising the steps of:
    preparing a solution of approximately between sixty seven and eighty five percent sodium, lithium or potassium silicate by weight, up to approximately three percent boric acid by weight and between approximately fifteen and thirty percent urea by weight;
    providing a spray dryer having a heated chamber, a top mounted atomizer rotary wheel and a side or bottom mounted dual fluid nozzle;
    spraying said solution from the top mounted atomizer rotary wheel to create microspheres and simultaneously coating said microspheres by spraying said solution from said side or bottom mounted dual fluid nozzle, said heated chamber being under vacuum of approximately 1 to 5 millibars and having an inlet temperature of between 650 and 800 degrees F. and an outlet temperature of between 275 and 350 degrees F.;
    transferring said microspheres to a secondary heating unit and further drying said microspheres under vacuum of approximately 1 to 5 millibars at a temperature between 500 and 1500 degrees F.

2. The process of claim 1, wherein said secondary heating unit is connected to said heating chamber of said spray dryer.

3. The process of claim 2, wherein said secondary heating unit is chosen from the group consisting of a tube furnace and a rotary kiln.

4. The process of claim 1, wherein said step of preparing a solution further comprises adding approximately one to five weight percent of sodium, lithium or potassium methyl siliconate.

5. The process of claim 4, wherein said step of preparing a solution further comprises adding up to 0.5 weight percent of a fluorocarbon surfactant and up to three weight percent of an alkali carbonate.

6. The process of claim 1, further comprising the step of applying a mist of sodium, lithium or potassium methyl siliconate to said microspheres within said secondary heating unit.

7. The process of claim 6, further comprising the step of passing said microspheres back through said spray dryer and recoating said microspheres with said solution prior to transfer of said microspheres to said secondary heating unit.

8. The process of claim 1, further comprising the step of passing said microspheres back through said spray dryer and recoating said microspheres with said solution prior to transfer of said microspheres to said secondary heating unit.

9. The process of claim 1, wherein said step of preparing a solution comprises mixing approximately seventy eight percent sodium, lithium or potassium silicate by weight, approximately three percent boric acid by weight and approximately nineteen percent urea by weight.

10. A ceramic vacuum microsphere manufacturing process comprising the steps of:
    preparing a solution of approximately between sixty and eighty percent sodium, lithium or potassium silicate by weight, up to approximately two weight percent of a fluorocarbon surfactant, up to approximately five weight percent of an alkali carbonate, between approximately fifteen to twenty five weight percent hydrogen peroxide and up to approximately five percent boric acid by weight;
    providing a spray dryer having a heated chamber, a top mounted atomizer rotary wheel and a side or bottom mounted dual fluid nozzle;
    spraying said solution from the top mounted atomizer rotary wheel to create microspheres and simultaneously coating said microspheres by spraying said solution from said side or bottom mounted dual fluid nozzle, said heated chamber being under vacuum and having an inlet temperature of between 650 and 800 degrees F. and an outlet temperature of between 275 and 350 degrees F.;
    transferring said microspheres to a secondary heating unit and further drying said microspheres under vacuum at a temperature between 500 and 1500 degrees F.

11. The process of claim 10, wherein said secondary heating unit is connected to said heating chamber of said spray dryer.

12. The process of claim 11, wherein said secondary heating unit is chosen from the group consisting of a tube furnace and a rotary kiln.

13. The process of claim 10, further comprising the step of applying a mist of sodium, lithium or potassium methyl siliconate to said microspheres within said secondary heating unit.

14. The process of claim 13, further comprising the step of passing said microspheres back through said spray dryer and recoating said microspheres with said solution prior to transfer of said microspheres to said secondary heating unit.

15. The process of claim 10, further comprising the step of passing said microspheres back through said spray dryer and recoating said microspheres with said solution prior to transfer of said microspheres to said secondary heating unit.

16. The process of claim 10, wherein said step of preparing a solution comprises mixing approximately seventy two percent sodium, lithium or potassium silicate by weight, approximately 0.5 weight percent of a fluorocarbon surfactant, approximately three weight percent of an alkali carbonate, approximately 21.5 weight percent hydrogen peroxide and approximately three percent boric acid by weight.

* * * * *